A. DOMBOWSKI.
RAT TRAP.
APPLICATION FILED APR. 16, 1912.
1,055,890.
Patented Mar. 11, 1913.
2 SHEETS—SHEET 2.
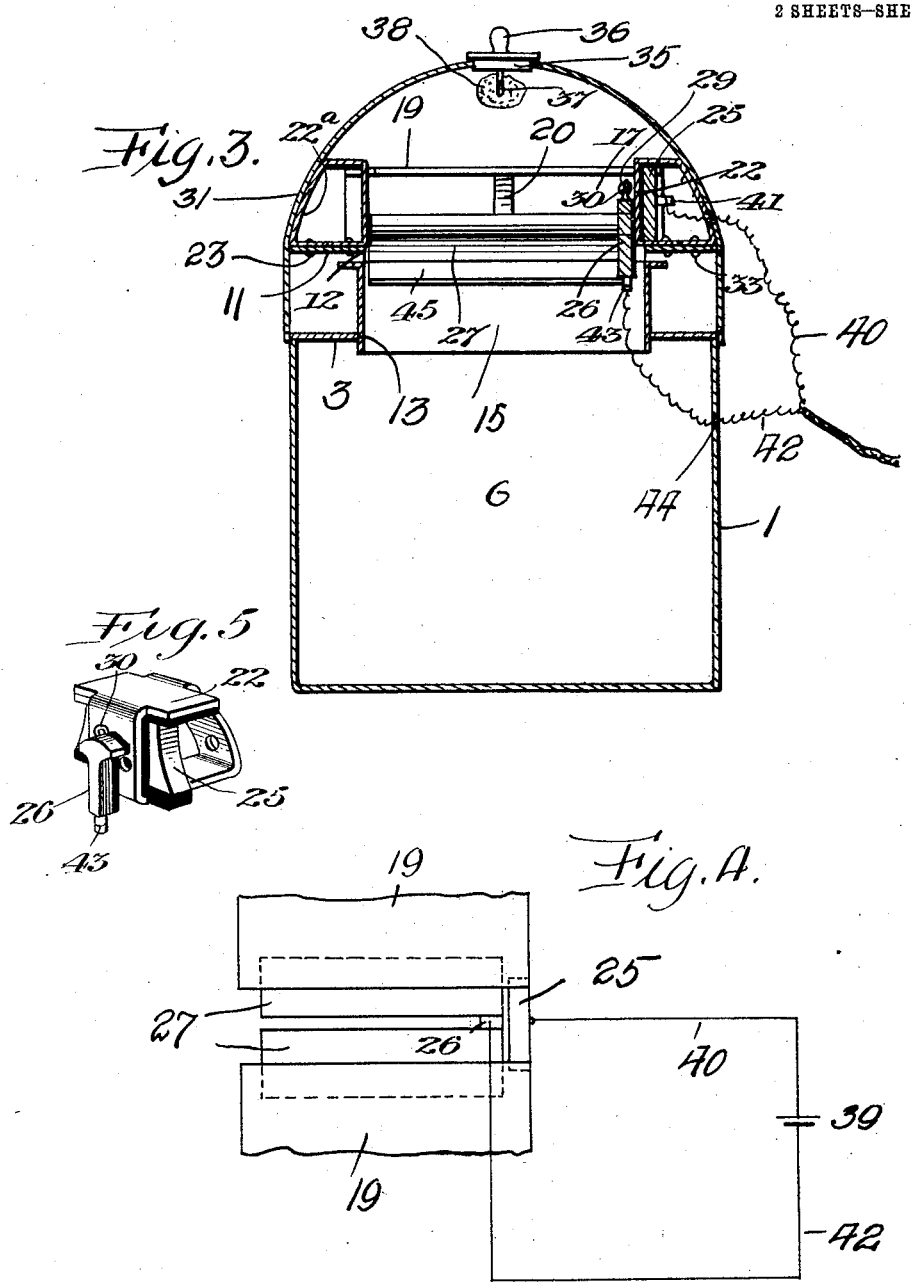
WITNESSES
Samuel Payne
Ralph C. Evert
INVENTOR
A. Dombowski
BY
ATTORNEYS
COLUMBIA PLANOGRAPH CO., WASHINGTON, D. C.

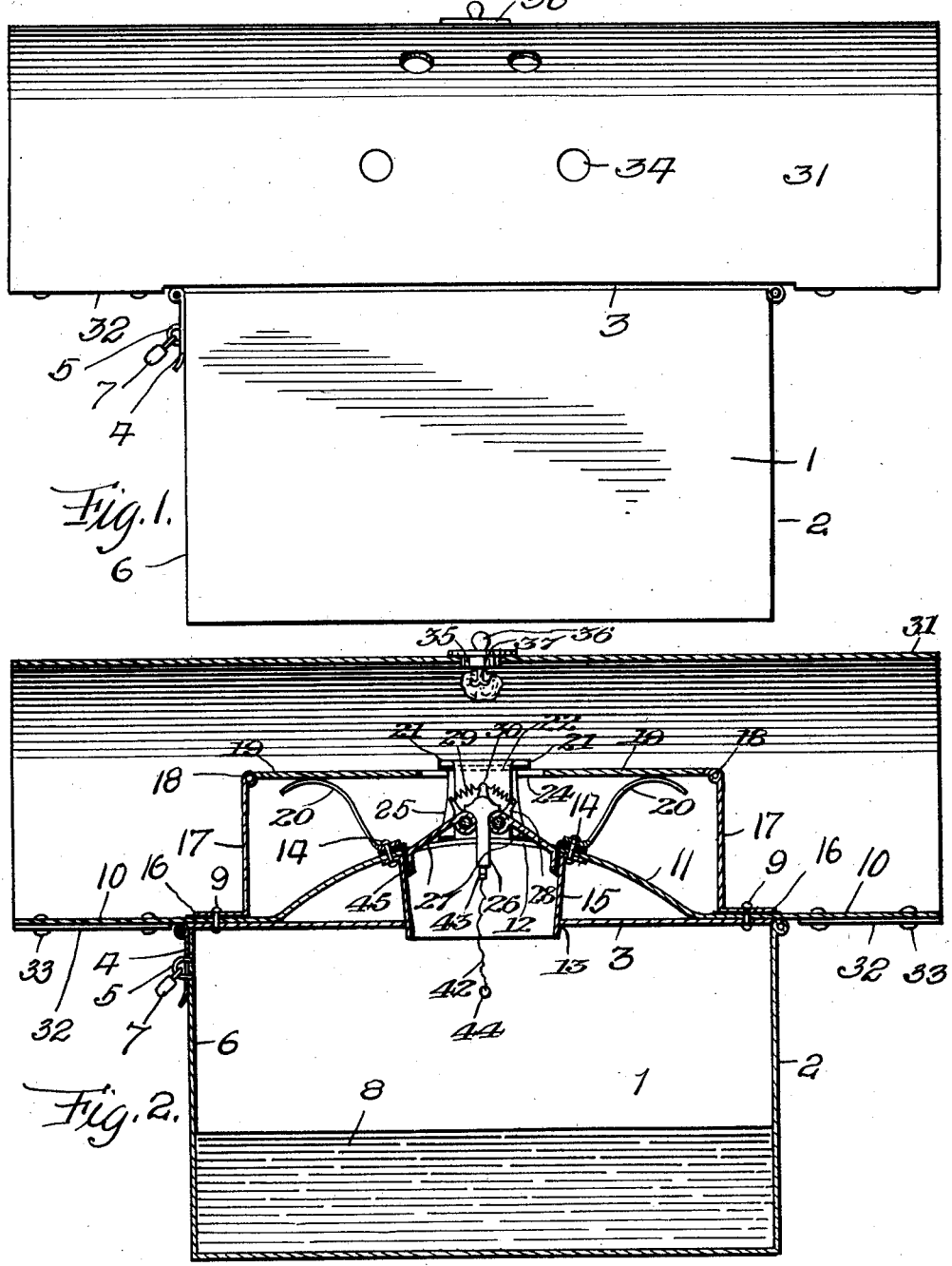

UNITED STATES PATENT OFFICE.

ANTHONI DOMBOWSKI, OF SEANOR, PENNSYLVANIA.

RAT-TRAP.

1,055,890.  Specification of Letters Patent.  Patented Mar. 11, 1913.

Application filed April 16, 1912. Serial No. 691,086.

*To all whom it may concern:*

Be it known that I, ANTHONI DOMBOWSKI, a subject of the Czar of Russia, residing at Seanor, in the county of Allegheny and State of Pennsylvania, have invented certain new and useful Improvements in Rat-Traps, of which the following is a specification, reference being had therein to the accompanying drawing.

This invention relates to rat traps, and the objects of my invention are to provide a trap wherein electricity is used for shocking and electrocuting rats and other rodents, and to provide a structure wherein trap doors are employed for entrapping a rat or rodent.

Other objects of my invention are to furnish a trap of the above type with a receptacle for collecting the bodies of rodents after they have been electrocuted, and to provide an electric rat trap that can be safely used and handled.

With the above and other objects in view the invention resides in the novel construction, combination and arrangement of parts to be hereinafter specifically described and then claimed.

Reference will now be had to the drawings wherein like numerals denote corresponding parts throughout the several views in which:—

Figure 1 is a side elevation of the trap. Fig. 2 is a longitudinal sectional view of the same. Fig. 3 is a cross sectional view of the trap, and Fig. 4 is a diagrammatic view illustrating the electrical connections of the trap.

A trap in accordance with this invention comprises a rectangular receptacle 1 having the end wall 2 thereof provided with a hinged lid 3.

The lid 3 is provided with a hinged hasp 4 adapted to fit over a staple 5, carried by the end wall 6 of the receptacle 1. A padlock 7, seal or other device can be placed in engagement with the staple 5 to hold the hasp 4 in engagement therewith. The receptacle 1 can contain a liquid 8, as a disinfectant or deodorant.

Riveted or otherwise connected, as at 9 to the lid 3 is an oblong bottom plate 10 having a central raised portion 11 provided with an opening 12 vertically alining with an opening 13 in the lid 3. Secured to the under side of the raised portion 11 by rivets or other fastening means 14 is a chute 15 that extends into the opening 13.

The rivets 9 hold the lower flanged edges 16 of transverse door supports 17 and hinged, as at 18 to the upper edges of the supports 17 are trap doors 19, corresponding in width to the supports 17. The trap doors 19 are supported normally in a horizontal position by flat springs 20 held upon the raised portion 11 of the bottom plate 10 by the rivets 14. The springs 20 are located centrally of the under side of the trap doors 19 and said trap doors are limited in their upward movement by projections 21 of straps 22 and $22^a$ riveted or otherwise connected, as at 23 to the raised portion 11 of the bottom plate 10. The inner ends of the trap doors are cut away, as at 24 and the inner ends of said trap doors, at one side thereof, are adapted to wipe a contact block 25 located within the strap 22.

Secured to the strap 22 is another contact block 26 and pivotally mounted between said straps and engaging the block 26 are auxiliary trap doors 27 normally closing the upper end of the chute 15. The pivoted edges of the trap doors 27 are provided with eyes 28 connected by coiled wires 29 to an eye 30 carried by the block 26 whereby the doors are electrically connected to the latter.

Arranged over the bottom plate 10 is a semi-cylindrical hood 31 having the ends thereof provided with lateral flanges 32 riveted or otherwise connected, as at 33 to the under side of the bottom plate 10, at the ends thereof. The hood 31 has ventilating openings 34 and a central opening 35. A block 36 is arranged within the opening 35, said block having a bait holder 37 for a bait 38.

An electric generator, battery cells or any suitable source of electric energy can be used in connection with the trap. For the convenience of illustration there is illustrated a battery 39 connected by a wire 40 to a binding post 41, carried by the contact block 25. Another wire 42 connects the battery to a binding post 43, carried by the contact 26. The wires 40 and 42 extend through openings 44 provided therefor in the wall of the receptacle 1, the hood 31 and the strap 22.

The reference numeral 45 denotes throughout the drawings suitable insulation, as fiber, it being necessary to use insulation at the connections of various parts of the trap to prevent grounding or short circuiting of the electric current. As instances of its use, the supports 17 are insulated from the bottom plate 10, the springs 20 insulated from the bottom plate 10, the auxiliary trap doors insulated from the straps 22 and 22ᵃ and from the chute 15, and the contact blocks 25 and 26 insulated from their supports. Other insulation can be used to insure proper electrical connections.

A rat or rodent attempting to obtain the bait 38 must jump or crawl upon one of the trap doors 19. This door is normally in an open circuit and as the door opens by the weight of a rat, the rat is deposited upon one of the auxiliary trap doors 27. The auxiliary trap door 27 is also in a normally open circuit and the circuit is completed by the rat's body. The rat is shocked to that extent that it cannot escape, as the auxiliary door 27 is opening and eventually the rat is deposited in the receptacle 1.

The coiled wires 29 serve as springs and the auxiliary doors 27 are restored to their normal position immediately upon the rat passing into the chute 15. The springs 20 restore the doors 19 to their normal position.

It is thought that the operation and utility of the trap will be apparent without further description, and while in the drawings there is illustrated a preferred embodiment of the invention, it is to be understood that the structural elements are susceptible to such variations as fall within the scope of the appended claims.

What I claim is:—

1. In a rat trap, the combination with a suitable source of electric energy, of a receptacle, a hinged lid carried thereby, a bottom plate secured to said lid and having a central raised portion provided with an opening alining with an opening in said lid, a hood secured to said bottom plate, tiltable trap doors arranged within said hood and in an open circuit with one side of said source of electric energy, auxiliary trap doors closing the opening of the raised portion of said bottom plate and in an open circuit with the other side of said source of electric energy and adapted to be placed in a complete circuit by a body connecting the first mentioned trap doors and said auxiliary trap doors, and means for normally retaining said trap doors in a closed position.

2. In a rat trap, the combination with a suitable source of electric energy, of a receptacle, a bottom plate secured to the top of said receptacle, said bottom plate having a central raised portion provided with an opening alining with an opening in the top of said receptacle, a chute arranged in said opening, trap door supports carried by said bottom plate, trap doors hinged to said supports and normally in an open circuit with one side of said source of electric energy, trap doors normally closing said chute and in an open circuit with the other side of said source of electric energy, a hood having the ends thereof secured to said bottom plate, a bait holder arranged centrally of the top of said hood and means for normally retaining said trap doors in a closed position.

3. In a rat trap, the combination with a suitable source of electric energy, of a receptacle, a bottom plate carried by the top thereof, a chute supported by said bottom plate in the top of said receptacle, trap door supports carried by said bottom plate, trap doors hinged to said supports and normally retained in a closed position, trap doors normally closing said chute, a contact block normally engaged by the first mentioned trap doors and in an open circuit with one side of said source of electric energy, a contact block normally engaged by said auxiliary trap doors and adapted to be placed in circuit with the other side of said source of electric energy and the first mentioned trap doors by the body of a rat, a bait holder arranged above the first mentioned trap doors, and means for normally maintaining all of said trap doors in a closed position.

In testimony whereof I affix my signature in the presence of two witnesses.

ANTHONI DOMBOWSKI.

Witnesses:
WALTER E. MEEK,
J. ANTONI CZVBCDEF.

---

Copies of this patent may be obtained for five cents each, by addressing the "Commissioner of Patents, Washington, D. C."